United States Patent [19]

Sacks et al.

[11] Patent Number: 4,920,273
[45] Date of Patent: Apr. 24, 1990

[54] Z-AXIS MEASUREMENT SYSTEM

[75] Inventors: Jack Sacks, Thousand Oaks; Ralph Weisner, Canoga Park, both of Calif.

[73] Assignee: View Engineering, Inc., Simi Valley, Calif.

[21] Appl. No.: 185,150

[22] Filed: Apr. 22, 1988

Related U.S. Application Data

[62] Division of Ser. No. 745,192, Jun. 17, 1985, Pat. No. 4,743,771.

[51] Int. Cl.$^5$ .................. G01N 21/86; G01V 9/04; G01C 3/08
[52] U.S. Cl. .................. 250/560; 356/376; 358/107
[58] Field of Search .................. 356/4, 378, 381; 358/107; 250/560, 237 R, 237 G, 201

[56] References Cited

U.S. PATENT DOCUMENTS

| | | | |
|---|---|---|---|
| 3,768,910 | 10/1973 | Zanoni | 356/4 |
| 4,009,386 | 2/1977 | Deml et al. | 250/201 |
| 4,115,005 | 9/1978 | Murata | 356/371 |
| 4,488,172 | 12/1984 | Hutchin | 356/4 |
| 4,564,296 | 1/1986 | Oshida et al. | 250/201 |
| 4,674,882 | 6/1987 | Dorman et al. | 356/373 |
| 4,725,722 | 2/1988 | Maeda et al. | 356/4 |
| 4,748,335 | 5/1988 | Lindow et al. | 356/376 |

FOREIGN PATENT DOCUMENTS 2511966 9/1976 Fed. Rep. of Germany .......... 356/4

*Primary Examiner*—David C. Nelms
*Assistant Examiner*—Michael Messinger
*Attorney, Agent, or Firm*—Merchant, Gould, Smith, Edell, Welter & Schmidt

[57] ABSTRACT

This invention concerns an optical system for use with a television camera for detecting the surface location of an object. A preferred optical image having a distinct, unique, recognizable pattern is projected on a surface along a defined path that ultimately falls on an imaging sensor associated with a television camera. The optical configuration causes a maximum light pattern energy to fall on the image sensor when the focal point coincides exactly with the surface of the object being detected. The system is not an automatic focussing system, since best focus is normally considered to be that condition which produces an image of maximum detail and sharpness, and the present invention does not rely on detail or sharpness of image for its operation. The invention can be used as an automatic focussing device if desired, since best focus can be derived as a useful by-product of accurate surface detection. In operation the camera moves in the Z direction through the point of maximum light pattern energy. The Z-axis position of the energy peak value is a function of the optical design. An output signal from the camera is filtered and processed and calculated to the Z-axis height of the camera as a measure of the distance to the object surface being detected.

6 Claims, 2 Drawing Sheets

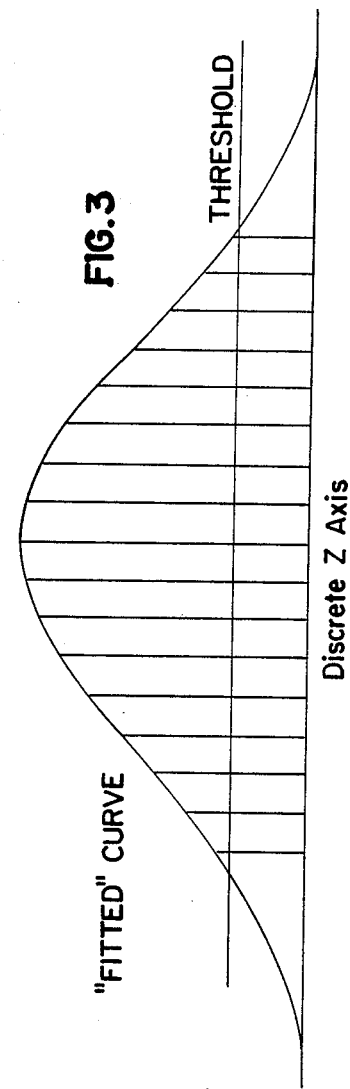
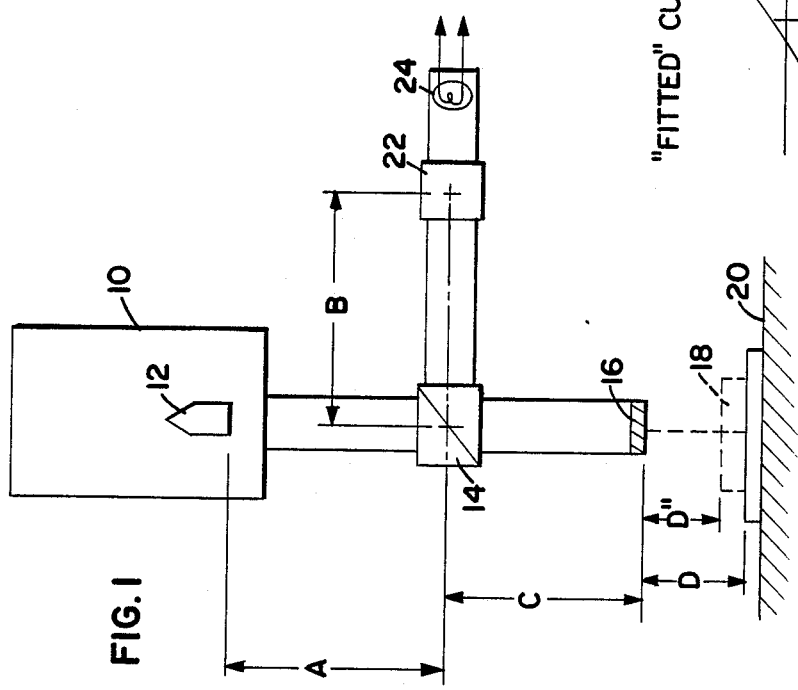

Z-AXIS MEASUREMENT SYSTEM

This is a continuation of co-pending application Ser. No. 06/745,192 filed on Jun. 17, 1985 now U.S. Pat. No. 4,743,771.

This invention is concerned generally with the field of noncontact measurement and more specifically with apparatus and method for optically determining the height in the Z-axis of objects having a surface located above or below a reference height or surface.

The field of noncontact measurement has wide application in industry, particularly as part of the manufacturing process, where requirements for both inspection and accurate measurement are critical to successful and profitable production. With the advent of high quality imaging photoelectric devices it is now technically and economically feasible to automate the functions of noncontact flaw detection, item counting, and precision measurement of virtually any type of industrial product.

The present invention is concerned with an electro-optical system which is capable of accurately and precisely detecting the location in the Z-axis direction and measuring its position in real time, and without the necessity of any physical contact between the measurement system and the surface of the object being detected.

There are a number of prior art systems designed to accomplish noncontact measurement of the type described here. One widely used method involves the concept of automatic focus. This concept makes use of the idea that best focus occurs when the object to be measured lies in the focal plane of the optical system. The height of the object relative to a reference can be determined by measuring the degree to which the image of the object to be measured is in focus in the image plane of the sensor such as in a television sensor.

The degree of focus can be measured by the content of high frequency energy in the image, based on the fact that the sharpness of an image is generally proportional to the content of high frequency or wideband energy in the image. Thus, by moving the camera through the point of maximum high frequency spatial detail in the image, it is possible to establish the height of the surface by measuring the Z-axis position of the camera at the point of best focus.

Autofocus systems have a major drawback which prevents them from being employed as a Z-axis measurement system. These prior art systems require surface detail or prominent features on the surface for their operation. They cannot be used to measure the height, for example, of clean specularly reflecting surfaces such as mirrors or polished metal. In addition, these systems cannot be used for measuring featureless Lambertian surfaces such as ceramic substrates, or poorly reflecting surfaces as might be encountered on dark plastic.

Certain types of automatic focussing systems are also sensitive to the orientation of surface features, such as lathe or tool marks on metal. If such marks are essentially parallel to the direction of scan lines on the sensor, little or no focus information can be derived from the scanning process, thereby making accurate Z-axis measurements impossible.

Another prior art Z-axis measurement system makes use of triangulation such as is commonly employed in range finders. These systems generally lack sufficient accuracy for making the kind of measurements required by industry, where required accuracies are of the order of one or two ten thousandths of an inch. There prior art systems also require more complex optical systems than other types of Z-axis measurement systems, as well as shorter working distances for equivalent accuracy. Working distance is the space between the outer surface of the objective lens and the surface to be measured, and should be of the order of several inches for maximum usefulness.

A third type of prior art Z-axis measurement system is the laser interferometer. These systems are relatively complex and expensive, and are not generally usable with a wide variety of surfaces. However, when used with specially designed retroreflectors that are carefully and critically adjusted, laser interferometers are capable of extremely accurate and precise measurements.

Air gauges are another form of making a noncontact surface or Z-axis measurement. These devices are widely used, inexpensive, and capable of achieving accurate and precise measurements. However, working distances are extremely short, commonly only a small fraction of an inch, and area resolution is relatively coarse and of the order of 1/16 inch, thus limiting the application of these devices.

It is the purpose of the present invention to overcome the shortcomings of the systems described above. Specifically, the present invention overcomes the problem of sensitivity to surface features, which limits the utility of prior art automatic focus systems for accurate Z-axis measurement. The present invention is capable of accurate measurement of the location of specular (mirror-like) surfaces, bland or featureless Lambertian surfaces, such as ceramic substrates, and dark, poorly reflecting surfaces such as are commonly encountered on plastic parts. The present invention can even locate and accurately measure the surface position of essentially transparent materials such as glass, providing that there is sufficient surface reflectivity to overcome signal to noise ratio limitations in the processing electronics. There is no requirement for surface features in the processing electronics so that measurement errors associated with surface features do not accumulate or degrade the quality of measurement.

The present system does not require short working distances to achieve high accuracies, nor does it require the use of special reflecting devices, such as are required by laser interferometer measurement systems. Nor does the present invention require large area, since the present invention can measure the Z-axis distance of a spot on the surface whose diameter is only a few thousandths of an inch.

The present invention achieves surface feature independence in a novel manner. An image is produced optically and projected by optical means to a point in space which is at a fixed distance from the outer surface of the objective lens of the measurement system. This fixed distance thus can be considered the working distance of the system, and is nominally of the order of six inches in the preferred embodiment.

The camera and optical system are rigidly and solidly attached to each other so that the combination can be moved together as a unit in the Z-axis direction with said Z-axis motion being accurately and precisely controllable in either an up or down direction. Movement is achieved by a servomotor mechanically coupled to a precision screw which raises or lowers the camera-optical system under precision electronic command and control.

Not only can the Z-axis position be accurately and precisely defined and controlled, but the rate of speed and acceleration of the moving system is controlled.

As the camera-optical system is moved, the projected optical image referred to earlier is moved. The projected image is moved up or down with respect to the surface of the object to be measured. The light energy reflected from the surface will vary in accordance with the distance of the projected image from the surface. Maximum light energy from the image will be reflected through the optical system to the sensor when the image plane coincides exactly with the surface of the object to be measured. The image energy falling on the sensitive surface of the sensor will decrease smoothly in proportion to the distance between the image and the surface. Although it turns out that maximum reflector energy images on the sensor when the optical image is in focus on the object surface, the present invention does not, strictly speaking, depend on the concept of focus for its operation.

In the preferred embodiment of the invention, the projected image is derived from a reticle of coarse grating, comprising a number of equally spaced opaque and transparent parallel bars that alternate with one another. All bars, opague and transparent, have equal width and such an arrangement is commonly referred to as a Ronchi ruling. The Ronchi ruling is illuminated from one side through a lens whose purpose is to fill the aperture of the systems's objective lens. The light energy which passes through the Ronchi ruling reflects from a partially silvered mirror or prism (beam splitter) so that its direction of travel is rotated 90 degrees. The light passes through the objective lens of the system, which brings it to a focus at some point in space which may or may not coincide with the surface of the object whose Z-axis position is to be determined. Whether or not the focused image of the Ronchi ruling falls on the surface depends on the Z-axis position of the moving system relative to the surface of the object.

If the Ronchi ruling image focuses on the surface, some fraction of its energy will be reflected back by the surface with the amount being dependent on the nature and reflectivity of the surface. After passing through the objective lens in the reverse direction, and then passing through the beam splitter in a direction orthogonal to that of the incident light energy coming directly from the Ronchi ruling itself, the light from the object surface will form a focussed image on the sensor. The optical system is preferably designed so that the distance between the focussed image in space and the Ronchi ruling is equal to the distance between the sensor and the image in space, so that there is a magnification of unity between the Ronchi ruling and the sensor.

The bars of the Ronchi ruling are rotationally oriented so that the image of the bars as it falls on the sensor is perpendicular to the direction of scan of the sensor. In other words, each line scan is at some angle and preferably at an angle other than parallel to the orientation of the bar pattern, thereby causing the electrical signal out of the camera, to contain a repetitive function having a fixed, stable, and known fundamental frequency component whose value is equal to the reciprocal of the period required to scan or readout one bar pair (opaque+transparent=one bar pair). The amplitude of the bar pattern signal is, of course, proportional to the amount of light energy reflected from the object surface. If the bar pattern image plane coincides with the surface of the object, the amplitude of the bar pattern image will be at a maximum value.

Consider now the meaning of the word "focus." In general, an image is said to be focussed when it contains a maximum of fine detail and when edges of objects contained within the image are sharpest. Resolution and definition are at their maximum values in a focussed image. Another way of defining that an image is in focus is to say that the highest spatial frequencies of the image are reproduced to the fullest extent. This expresses focus in terms of spectral energy content (images can be evaluated in terms of two dimensional spectra, similar in concept to the one dimensional Fourier spectrum of a function of time). By analogy with one dimensional functions, images can also be said to have transfer functions which are called "modulation transfer functions," and which present frequency distribution in one or two dimensional graphic form. Focussed images contain more "high frequency" spectral energy than those which are not focussed.

Automatic focussing systems operate in a manner calculated to maximize the high frequency energy in an image, and to broaden the modulation transfer function. This occurs when maximum detail is visible and the edges of objects in the image are sharpest (image blur is minimized). In contrast to automatic focussing systems, the present invention does not operate to maximize the high frequency spectral content of an image, nor does it operate by enhancing edge sharpness. It operates on the principle that the energy content of any frequency component in the spectrum will rise to a maximum value when the modulation transfer function is broadened to the maximum extent. This holds for low spectral frequency components as well as high frequency components. The fact that the image contains maximum energy at all frequencies when it is in focus allows the invention to be used as an automatic focusing system as well as a Z-axis measurement system if desired. It is emphasized that automatic focus capability of the invention is a useful byproduct, and not the primary purpose of the invention, nor does the invention depend on the phenomena of focus for its operation.

There are disadvantages to the use of high frequency information to obtain Z-axis measurements, or to try to broaden the bandwidth of a measurement system as is commonly done in automatic focusing systems by signal differentiation or high frequency enhancement. One principal disadvantage derives form the fact that spectral energy in an image decreases with increasing frequency, even in a focussed image, whereas noise content introduced in the sensor and processing electronic circuits either remains constant independent of frequency or rises with increasing frequency. Operation which depends on high frequency enhancement or even depends on high frequency spectral content for its operation must be excessively prone to noise induced errors and performance limitations.

In the present invention, there is a serious disadvantage inherent in the use of high frequency or wide band information that is caused by the nature of some of the types of surfaces that the system may be employed to measure. Specifically, a porous surface such as a ceramic substrate can diffuse and scatter light by virtue of subsurface penetration. Such diffusion and scattering can cause an attenuation of high frequency energy in proportion to frequency, thus further degrading signal to noise ratio and measurement accuracy. Furthermore, surface irregularities such as are commonly encountered on machined or ground surfaces diffuse high frequency patterns or details much more than lower spatial frequency patterns, also degrading signal to noise ratios and measurement accuracy.

Special frequencies that are too low will degrade overall performance because the energy peak will be too poorly defined, thereby reducing measurement accuracy. The present invention is optimally configured to operate with a Ronchi spatial frequency that does not lie near either extreme of the modulation transfer function, but is selected on the high frequency side of the "knee" of the modulation transfer function. In a preferred embodiment, a compromise spatial Ronchi frequency is selected that will produce a fundamental signal frequency of about 460 kilohertz. This provides good results with ceramic surfaces.

The present invention operates solely on the basis of projecting an image on the object surface of interest (in the case of the present invention, the image is that of a Ronchi ruling). It is neither necessary nor desirable for the system to "see" or detect object surface features. There are good reasons for this. In the first place, most surface features are of the type associated with roughness of the surface, and the shadows which result when these irregularities are illuminated. Unless means are incorporated in the processing to discriminate against them, the processor cannot distinguish between the projected Ronchi pattern and the image of the irregularities, thus causing confusion in the processor. If the surface irregularities are of the deep type, significant measurement errors can occur.

A second reason for rejecting surface features concerns bandwidth and signal to noise ratios. Since surface features can have any size and shape, and size and shape may be randomly distributed, a processor would require wide bandwidth, and wide bandwidth would allow more noise to enter the system. A third reason for excluding surface features is that these features may be oriented in any direction. To properly process them requires a capability to differentiate or enhance video features or edges in any direction. Differentiation, as a process, degrades signal to noise ratio, and should therefore be avoided.

The present invention includes means for reducing or substantially eliminating most surface features from the tracking and measurement process. The surface feature elimination process is based on the fact that the signal energy derived by sensor scanning of the surface features generally spreads throughout the video spectrum, decreasing with increasing frequency, whereas the video energy associated with the scanning of the Ronchi ruling bars peaks at the fundamental frequency of the scanned bar video signal, and decreases rapidly on either side of the fundamental. Thus, a filter centered on the fundamental bar frequency, and sufficiently narrow band to discriminate against and therefore exclude nearly all of the signal spectral energy caused by scanning the surface features can virtually eliminate all surface feature energy in the video signal. Such a filter can be considered a matched filter in the sense that the eliminated surface feature signals can be thought of as a form of noise or interference.

The narrow band filter need have only sufficient bandwidth to allow stable operation of the system at the speeds necessary or desirable. In the preferred embodiment, the filter bandwidth is selected to be approximately forty kilohertz. This bandwidth is sufficient to pass substantially all of the fundamental energy of the bar pattern signal without passing more than an insignificant amount of energy from other components of the video signal, such as surface features, but at the same time the filter bandwidth is not so narrow as to cause problems with center frequency selection or frequency drift.

In operation, the Z-axis moving system comprises the camera and its contained television sensor, the optical subsystem, the Ronchi ruling, the means for illuminating the Ronchi ruling, the drive motor and its associated components, and the means for determining the Z-axis position of the moving system which all move together as a unit in a vertical Z-axis direction. The range of this motion includes or brackets the position of maximum detectable Ronchi pattern energy, which is the point to be determined or located in the Z-axis direction with high accuracy. The system movement is at a constant velocity, at the highest speed commensurate with accurate measurement.

During each vertical scan of the sensor, the AC output of the narrow band matched filter will have an amplitude proportionate to the Ronchi ruling bar pattern energy in the light reflected from the object surface. In the preferred embodiment, this AC signal will comprise a sinusoid whose frequency is 460 kilohertz. Because the filter is wide enough to admit one upper and one lower sideband (caused by modulation of the 460 kilohertz "carrier" by the 15,750 Hz. camera horizontal scan blanking), the filter output signal will appear to be amplitude modulated; this modulation is incidental, however, and has no significant effect on operation of the system. Compared to the full video bandwidth of the camera (nominally, about four megahertz), the narrow band filter (about 40 kilohertz) substantially reduces the noise. The signal to noise ratio is therefore enhanced about 40 db., since the signal derived from the Ronchi ruling bar pattern is not significantly attenuated by the filter. After filtering, the Ronchi signal is full wave rectified (absolute valued) and integrated over the measurement area, and this integrated signal is sampled at the end of the measurement window. A sample is thus obtained each time a field scan is completed, thereby making the effective sampling rate sixty samples per second.

These samples are then converted to digital form by an analog to digital converter and stored in a digital memory or storage register. Along with these values, the corresponding Z-axis position values (also digital numbers) are stored in memory, so that the two sets of numbers can be correlated. Both sets of numbers are then read out and entered into a computer, where interpolattion and smoothing algorithms fit a smooth curve to the data points and linearly interpolate between the Z-axis position values.

As the moving system containing the camera and optics moves smoothly and at a constant speed through the Z-axis region of interest, the mathematical curve which represents the best and smoothest fit to the data points takes the form of a ball shaped curve, whose peak occurs at the point of maximum energy at the fundamental Ronchi ruling scanned frequency. This peak may or may not occur exactly at a data point, and in fact will probably occur between data points. The peak of the curve will also occur at the point of best focus on the Ronchi bar pattern.

This point represents an exact and repeatable Z-axis position with respect to the object surface whose Z-axis position is to be determined, and the accurate measurement of the Z-axis position of this point is the main purpose of the present invention. As mentioned, the Z-axis positions of the data points are interpolated, and the smoothed and interpolated position values provide highly accurate Z-axis information about the object surface. Only differential Z-axis measurements have significance, since the heigth of a single point without any reference is meaningless. Therefore in a sense, only thicknesses or height differences, such as the height of an object surface above or below another surface, have any useful meaning. Thus, to be useful, a measurement must comprise two separate Z-axis determinations. A typical application might be the determination of the thicknesses of various deposited layers of electrically conductive material on a substrate or printed circuit board. Another application might be to determine the height of an object by measuring the Z-axis position of the platform on which the object to be measured rests, and to subtract this reading from the measured Z-axis height of the object.

In the broadest sense, any kind of unique and recognizable pattern can be used in place of the Ronchi ruling, and a suitable matched filter employed to extract the image of the pattern from its background to maximize signal to noise ratio.

Consider now the bell shaped curve of data points generated as the moving system first moves toward the position of maximum energy from a position off to one side of the peak, and then after moving through the position of maximum energy, proceeds away from the maxiumum point on the other side of the peak. As mentioned, a smooth curve may be fitted to the data points so that the actual peak of the data can be located even if it does not fall directly on a data sample. An alternate method of finding the peak is to truncate the peak in amplitude, say at 50% of the peak value and then calculate the centroid of the sample values that lie above the truncation threshold. The centroid is equivalent to a center of gravity or center of pass (sometimes called the first moment). This method may be preferred over the process of mathematically fitting a curve to the data because of its simplicity and speed of computation.

In the preferred embodiment, the camera is moved at a constant speed, and the output data samples occur at the vertical field scanning rate of the camera, which is nominally 60 samples per second. A precision scale is rigidly attached to the fixed structure upon which the camera is mounted in such a way that the position of the camera in the Z-axis direction can be determined with great accuracy by reading the scale with a movable scale reader that is rigidly attached to the camera and moves with it. A typical scale is made of temperature stable glass and is read out optically to an accuracy of forty millionths of an inch (one micron). The scale reader is interrogate sixty times a second, so that one scale reading is obtained for each data sample.

Further objects and advantages of the present invention will be made more apparent by referring now to the accompanying drawings wherein:

FIG. 1 is a schematic diagram illustrating the preferred optics for projecting a desired image;

FIG. 3 is a curve illustrating the varying amplitude of the detected encoded signal for different height positions of the camera.

Figure 2:
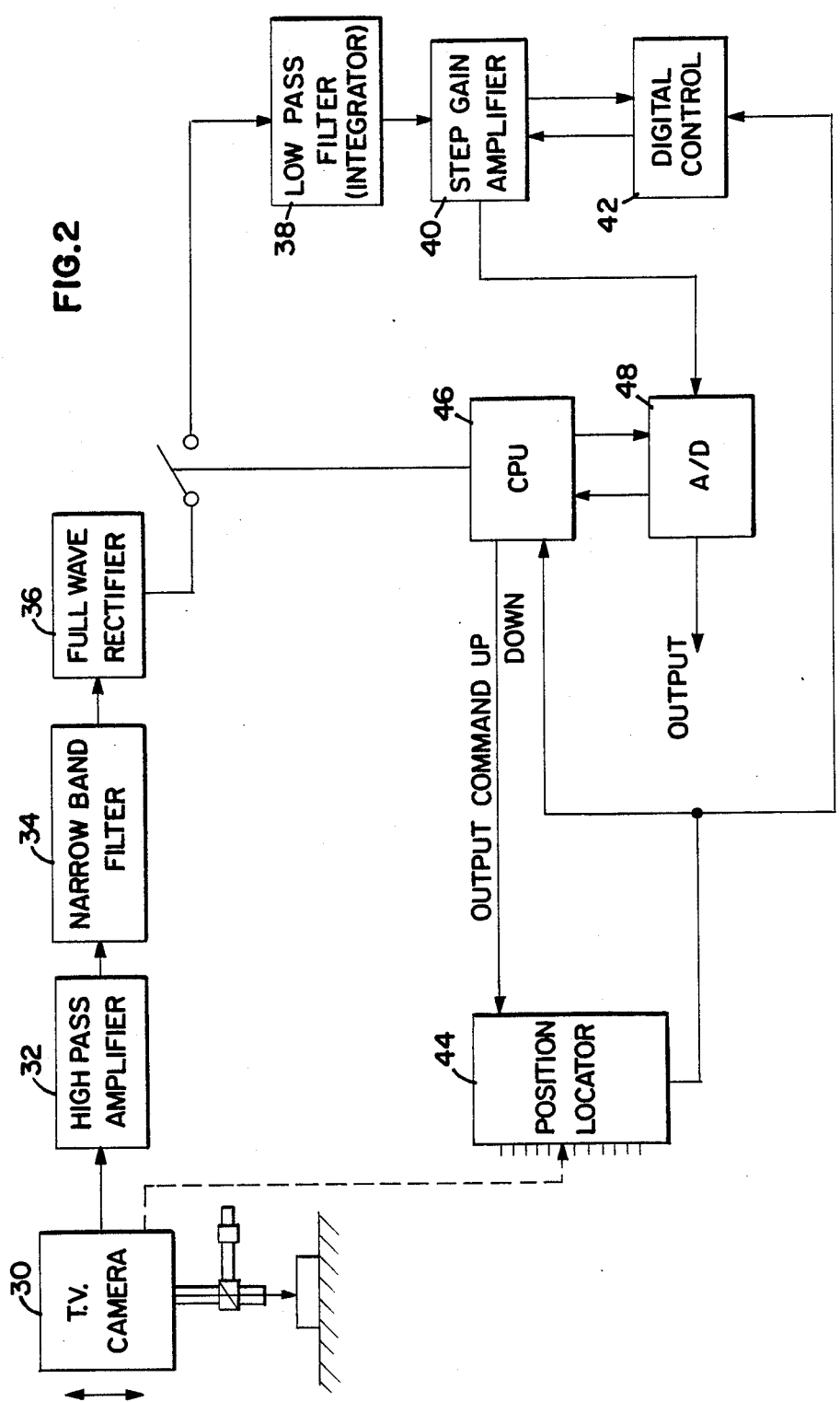
FIG. 2 is a block diagram of the system used to detect the encoded projected image.

Referring now to FIG. 1, there is shown a preferred diagram of the optical system constructed according to the teachings of this invention. A TV camera 10 having a sensor 12 is located coaxially and in a fixed relationship with a beam splitting mirror assembly 14 that is located in line with an objective lens 16, which assembly is located above an object 18 located on a suitable substrate 20.

In the preferred embodiment a grating 22 in the form of a Ronchi ruling is located in a coaxial illuminated block and lined orthogonally with the split mirror 14. A light source 24 is coaxially aligned with the grating 22 so as to illuminate it. The projected image of the grating is focussed via the beam split mirror 14 and the objective lens 16 to the subject surface. The reflected image is then reimaged at the sensor 12.

The subject surface is like a screen on which the image of the Ronchi ruling is projected and subsequently reflected and reimaged at the camera sensor 12. This image in effect provides a high contrast target for the video system to focus on.

The magnification of the Ronchi ruling to the camera sensor is in all cases one to one and for this reason an electronic narrow band filter can be used to detect a square wave signal of the Ronchi ruling regardless of the system magnification.

The distance A represents the distance from the sensor 12 to the beam splitter 14. The distance B represents the distance from the Ronchi ruling to the beam splitter. Distance C represents the distance from the beam splitter to the objective lens. Distances D and D double prime representing two different height measurements.

In all cases distance A equals distance B and therefore the following relationship holds true:

$A = B$ $C + A = C + B$ $(C + A/D) = \text{magnification} = (C = B/D)$

Having established the optical parameters it can now be appreciated that the image from the grating 22 is simply projected onto the object 18 and that by detecting the encoded image located on the surface it is now possible to detect the location of the surface by measuring the maximum amplitude of the detected encoded signal as the camera assembly is moved in a vertical direction.

In effect, the optical system simply projects an image onto a surface and then the projected image is located by focusing on the detected projected image which can be at focus at only one location and that would be on the surface. The camera assembly is moved up and down in the Z direction very slightly to determine a maximum amplitude in the energy at that detected frequency. Maximum amplitude output signal correlates to height above the projected image. By projecting the image of light on the surface, it is now possible to determine height above the surface.

The frequency of the detected signal is a function of the sweep rate of the camera being used and the distance between the bars comprising the Ronchi grating. Hence, measuring the height above the projected image becomes completely independent of the surface parameters being optically reviewed by the camera.

Tests have shown that focusing on a subject like a mirror gives the best image and highest contrast, while focusing on a matte surface gives the lowest contrast. In the present invention the surface structure or texture is not being viewed directly by the camera optical system but only the image projected on the surface is being detected. It is now possible to detect the surface and heights of items above the surface regardless of the surface parameters or marks on the surface or any indicia of the surface itself. The Z-axis measuring technique above the surface is now completely independent of the surface parameters.

The encoding of the projected image is completely arbitrary and is a function of the sweep rate of the television camera and the spacing between the bars on the grating actually used.

In the preferred embodiment a Ronchi grating is used and a conventional vidicon camera producing 60 fields per second is used. Since the TV camera scans 15,750 lines per second across the projected Ronchi image, an output frequency of approximately 455 kilohertz is generated. Using a grating having different spacing would of necessity generate a different output frequency, however, the principal is the same.

In actual practice the TV camera and optical assembly is moved in the Z direction and a reading is determined by measuring the maximum amplitude of the detected output signal as a measure of the best focus. Once the best focus is determined the system knows where the surface is since $A=B$ and $C+A$ must equal $C+B$.

Referring now to FIG. 2, there is illustrated a block diagram illustrating the overall system for detecting the maximum amplitude of the encoded signal as a function of the best focus and hence the position of the surface.

The primary purpose of the described system is to make height measurements in the Z-axis and hence it is first necessary to determine the location of the surface by the system described in FIG. 1. The technique basically involves projecting a predetermined grid pattern of known spacial frequency onto the surface through a set of optics and detecting the projected image as a function of the best focus and hence the location of the surface. In other words, if the optical system is at a distance that allows the image of the surface to be in focus, then the projected image will also be in focus at exactly the same place and same time. The technique basically involves processing the information which is now an electrical video signal that represents the bar pattern of the preferred image that is projected.

In the preferred embodiment a center frequency of 455 kilohertz was chosen only because it was most convenient to obtain narrow band filters located at that particular frequency. There is nothing special about the frequency of 455 kilohertz since any other frequency could have been used. This frequency depends only on the spacing of the bars comprising the Ronchi grid and the sweep frequency of the television camera. The image seen by the television camera 30 is actually the projected image of the Ronchi grading illustrated in more detail in FIG. 1. The television camera 30 scans the Ronchi grid and produces an electrical waveform representing the optical image. The output signal from the television camera 30 produces a square wave at 455 kilohertz which corresponds to the optically projected image. The output of the television camera is fed into a high pass amplifier 32 which basically amplifies mostly the higher frequency components, that is, the frequency component in the neighborhood of 455 kilohertz. The output of the high pass amplifier 32 is fed to a narrow band pass filter 34 having a center frequency at 455 kilohertz and a bandwidth of approximately ± 15 kilohertz from the center frequency or a total bandwidth of 30 kilohertz.

The output of the narrow band filter 34 is fed to a full wave rectifier 36 whose function is to convert the sine wave fundamental frequency of this bar pattern located at 455 kilohertz into a full wave rectified signal which is used to produce negative-going cusps at the sign wave frequency which are fed into a low pass filter integrator 38. The integrator 38 acts as a low pass filter which integrates the energy content of that signal during a preferred time period. In other words, the output of the low pass filter integrator 38 would be a signal that would start at zero volts and wrap up to some positive voltage and in which the magnitude of the positive voltage would be representative of the degree of focus.

As the TV camera 30 moves in a vertical direction and goes through focus, the amplitude of the detected signal on either side of focus is low and as the system approaches focus the amplitude rises and reaches a peak and as the TV camera passes through focus the output of the amplitude decreases. A review of FIG. 3 will show a curve illustrating the amplitude of the detected signal as the TV camera 30 moves from a point on one side of focus, through focus, and then to a point on the other side of focus.

At discrete positions determined by the speed of the mechanical motion in the Z axis of the television camera 30 and the data processing and sampling rates of the electronics in the computer, the system continually makes a measurement of the amplitude of the detected signal. This process takes the analog signal from the low pass filter integrator 38 and converts it to an eight bit digital number. The eight bit digital number is then read by the computer and stored and processed through a step gain amplifier 40 that is controlled by a digital control system 42. A position locator 44 also contains a highly accurate scale known as a Heidenhain glass scale for accurately determining the position of the TV camera. A central processing unit 46 cooperates with the position locator 44 and feeds an A to D converter 48 which also receives an output of the step gain amplifier 40 for generating the desired output signals for each position of the TV camera 30.

At each point of movement of the TV camera 30, a measurement of the amplitude of the focus value which is the output of the low pass filter integrator 38 is determined in order to determine what the Z-axis position is. A complete range of values in the Z-axis is determined on either side of focus as shown in FIG. 3 and as a result it is possible to set a threshold of measured values as a function of the focus values since experience will determine a relationship between amplitude values of the detected signal and the position of best focus. The CPU 46 processes these values which are above the threshold and takes a centroid of all the data read to determine the theoretical maximum value and then correlates the theoretical maximum value determined with the actual position of the TV camera 30 from the position locator 44 to generate an output signal from the A/D converter 48 indicative of best focus which is also indicative of the position of the surface under test.

At this point in time, having determined the best focus, the TV camera is then positioned to the position just determined as correlating to the point of maximum calculated output signal and at that point height measurements in the Z axis of items on the substrate can be given. Height measurement differences are determined at different points and the focus value at two different points is read by the computer and substracted and the output signal is the height differential between those two points.

The system may also be called a match filter since an image of known spacial frequencies is projected through a filter of defined characteristics. All of the information is allowed to come through the filter and the detected output signal is run through a very narrow band system so that the information that is derived is extremely high in signal to noise content.

The video signal from the TV camera 30 is fed into a high pass amplifier 32 due to the fact that most of the video content is at the lower frequencies; however, the information relative to focusing is located at 455 kilohertz where there is normally not very much energy.

The actual implementation of the step gain amplifier 40 is functionally determined by the characteristics of the A to D converter 48.

A significant and useful feature of the invention is the incorporation of specific means to discriminate against, and virtually eliminate the effects of surface features from the measurement process. The purpose of this is to enable the system to be able to detect, track, and measure a wide variety of surfaces, including those which have no recognizable surface features, such as a specularly reflecting mirror, or a piece of glass having low surface reflectivity, as well as surfaces having irregular or regular features, having either smooth or rough finishes.

In operation, the camera system is moved at constant speed through a range which brackets the point of impingement on the sensor of maximum reflected energy from the object surface. The direction of camera travel is perpendicular to the nominal X-Y plane of the system; thus the camera moves parallel to or along the Z-axis. In the process of moving through the said range, light energy reflected from the object surface rises to a maximum and then decays to an arbitrary value at the end of travel. The values of reflected energy throughout the range of travel are dependent on the reflective nature of the object features. The Z-axis position of the energy peak value is by design a function of the optical system, and once parameters are chosen and design fixed, the distance between a reference point on the moving system and the object surface at which the energy peak occurs will not change. It is the Z-axis position of the energy peak which is considered to be the measure of the Z-axis position of the object surface.

The output signal from the moving camera system is filtered in a manner calculated to preserve maximum signal from the image projected on the object surface, and to attenuate reflected energy patterns which arise from irregularities or patterns which are part of the object surface itself. It is a further purpose of the filter to narrow the bandwidth of the signal in such a manner as to substantially reduce random or other types of noise. Such a filter may be considered a matched filter in the sense that it enhances the desired signal in an optimum manner with respect to all other signals, which can be thought of as performance degrading interferences. The filtered signal then enters a processor, where it is sampled in a periodic manner, nominally the field or frame scan rate of the camera, and correlated against Z-axis position to determine the Z-axis height of the point on the object surface that is being measured. The processor also includes means to control the gain of the measurement system so as to maximize the dynamic range of the measurement system. Specifically, the automatic gain control function allows the system to handle a very wide range of object surface reflectivities without manual intervention. Thus the system can automatically determine the Z-axis position of an object surface very accurately, and relatively independent of surface features and over a wide range of surface reflectivities.

We claim:

1. A system for deriving information relative to the surface of an object under examination, comprising:
    first means movable toward and away from the surface of the object along a movement axis and including optical means having a selected focal length for scanning the surface of the object in a selected direction to derive a signal responsive thereto, the optical means generating a video output signal having an amplitude proportional to an amount of light energy reflected from the surface of the object;
    image generating means movable with the first means for superimposing an image on the surface, the image having a focal plane at a predetermined distance from the optical means and the image having periodic variations along the scanning direction;
    video output signal sensing means, the video output signal sensing means periodically measuring the amplitude of reflected light energy as the optical means moves towards the surface of the object;
    central processing means, the central processing means calculating a centroid of all amplitude measurements, thereby determining an optical means position corresponding to maximum reflected light energy; and
    means responsive to the signal from the optical means for controlling the first means so as to cause the first menas to return the optical means to a position corresponding to a maximum amplitude in the signal at a predetermined frequency generated by the periodic variations.

2. The invention as set forth in claim 1 above, wherein the means for controlling the first means comprises filter means responsive to signals at the predetermined frequency, and means coupled to the filter means for determining the position of the first means at which the signal is at maximum amplitude, whereby the superimposed image is in focus.

3. The invention as set forth in claim 2 above, wherein the system further includes means parallel to the movement axis of the first means for indicating the position of the first means.

4. The method of ascertaining surface characteristics of an object comprising the steps of:
    projecting a spatially distributed periodic image, from a projection source, onto the surface of the object, the image focusing at a preselected image plane from the projection source;
    optically scanning the image of the surface of the object and the projected images thereon to derive a signal modulated in accordance with the periodicity of the image;
    varying the position of the focal plane in a constant direction relative to the surface of the object so as to vary the modulation characteristic of the signal, thereby, causing the focal plane to transition through and beyond a maximum value of the modulation characteristics; and identifying a predetermined modulation characteristic in the signal.

5. The method as set forth in claim 4 above, wherein the signal is filtered at the frequency derived from scanning across the periodic image, and where the predetermined modulation characteristic is maximum output in the filtered signal.

6. The method as set forth in claim 5 above, including measurement of the position of the focal plane when maximum output is achieved.

* * * * *

UNITED STATES PATENT AND TRADEMARK OFFICE
CERTIFICATE OF CORRECTION

PATENT NO.   : 4,920,273

DATED        : April 24, 1990

INVENTOR(S)  : Ralph Weisner

It is certified that error appears in the above-identified patent and that said Letters Patent is hereby corrected as shown below:

First page: after "[75] Inventors:", delete "Jack Sacks, Thousand Oaks;" after "Canoga Park," delete "both of".

Signed and Sealed this

Second Day of July, 1991

Attest:

HARRY F. MANBECK, JR.

*Attesting Officer*   Commissioner of Patents and Trademarks